Dec. 9, 1924.
R. H. McLAIN
1,518,592
CONTROL OF INDUCTION MOTORS
Filed Jan. 12, 1921
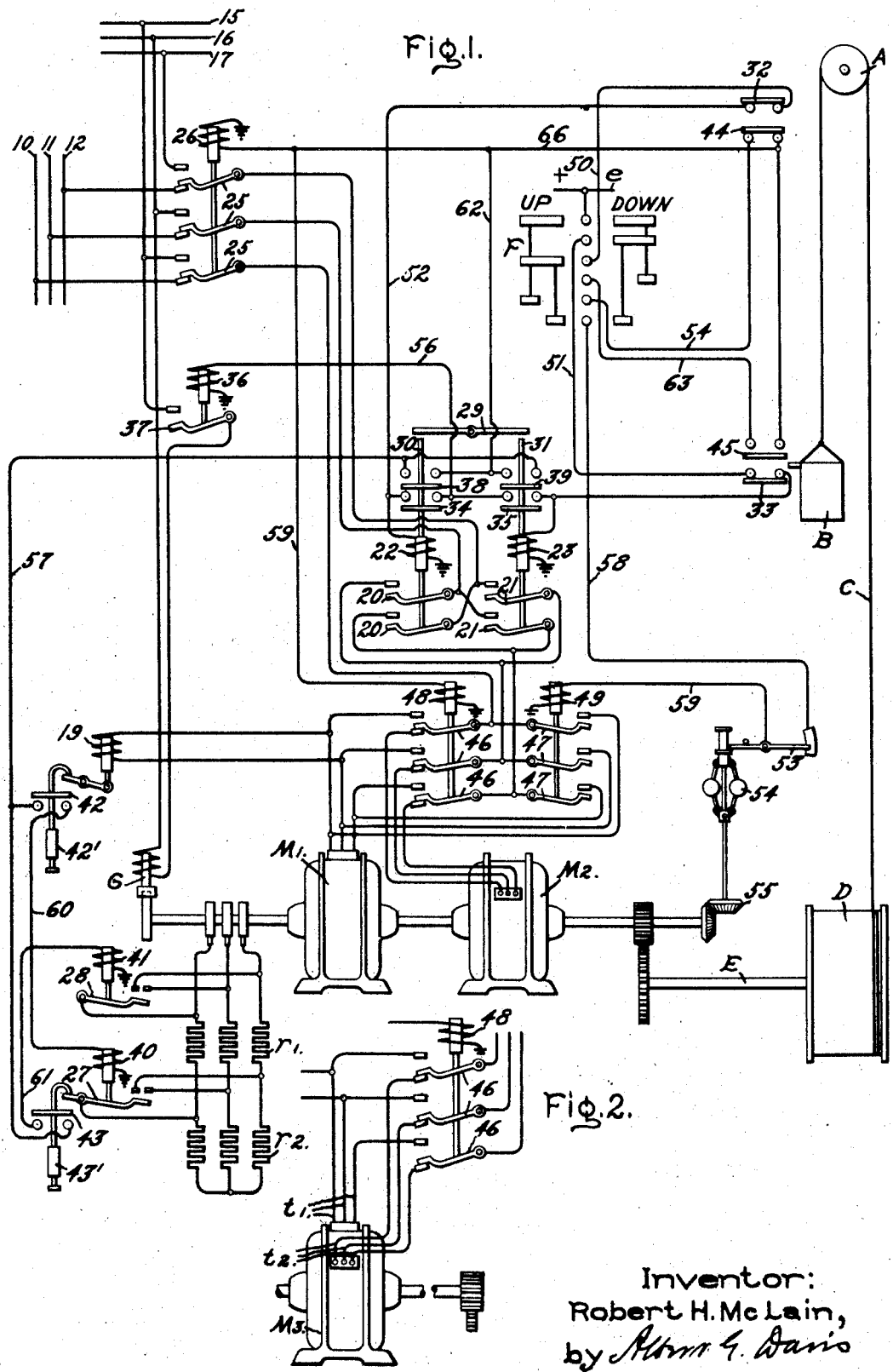
Inventor:
Robert H. McLain,
by Albert G. Davis
His Attorney.

Patented Dec. 9, 1924.

1,518,592

UNITED STATES PATENT OFFICE.

ROBERT H. McLAIN, OF SCHENECTADY, NEW YORK, ASSIGNOR TO GENERAL ELECTRIC COMPANY, A CORPORATION OF NEW YORK.

CONTROL OF INDUCTION MOTORS.

Application filed January 12, 1921. Serial No. 436,758.

*To all whom it may concern:*

Be it known that I, ROBERT H. MCLAIN, a citizen of the United States, residing at Schenectady, in the county of Schenectady, State of New York, have invented certain new and useful Improvements in Control of Induction Motors, of which the following is a specification.

This invention relates to the control of alternating current motors of the induction type and has for its object the provision of means for simply and efficiently changing the motor speed.

More specifically, this invention is designed to provide means for enabling an induction motor to run with a maximum number of substantially definite speeds.

By reason of the extensive use of alternating currents and by reason of its general simplicity, the use of induction motors for power purposes is very desirable. Its most conspicuous limitation, however, is the lack of convenient speed regulation.

Induction motors capable of being operated at a plurality of speeds known as the multi-speed type have been devised, in which a plurality of field windings are used arranged to give different numbers of poles together with switch gear for changing from one winding to another.

It has also been proposed to use an induction motor having constant or but a small range of speed in connection with a plurality of sources of power having different frequencies. The motor is connected to these sources of power as changes in speed are desired by means of appropriate switching devices. This scheme is disclosed in my U. S. Patent No. 1,347,751, dated July 27, 1920, and assigned to the assignee of the present application.

In carrying my invention into effect I use an induction motor of the multi-speed type in combination with a plurality of power circuits of different frequencies such that when each winding of the motor is energized from each of the sources, each resulting synchronous speed is different from the synchronous speeds of every other winding. I may also use a plurality of driving motors having different numbers of poles instead of one motor equipped with a plurality of field windings. By means of appropriate switching devices having a progressive sequence of operation I apply the various sources of power to the different windings in a definite sequence and am enabled thereby to obtain a maximum number of running speeds as well as gradual and even acceleration or deceleration of a common load which may be driven by the motors.

When using a plurality of connected motors having different numbers of poles I may use one or more motors of the type having external resistance in the rotor circuit, the others being of the short circuited rotor type. In such case I may apply power to both types of motors in starting, thereby utilizing the comparatively high starting torque of the external resistance type motor during acceleration.

An induction motor having its speed controlled in this manner has an advantage over a direct current motor since commutator troubles are absent and also because it runs at low speeds with practically constant angular velocity under widely varying loads and operates with substantially the same losses on low speeds as on high speeds, whereas a direct current motor consumes power, at the low speeds, in the regulating resistance which reduces the over-all efficiency.

In installations which would require either a rotary converter to supply the direct current motors or a frequency changer to supply the second source of current for induction motors controlled in accordance with my invention, the latter would still have the advantage over the former, in case of the failure of either the rotary converter or frequency changer, in that the direct current motor would have to be shut down, whereas the induction motor could still be operated in some manner from the original source of alternating current.

My invention may be applied with advantage in the operation of elevators and hoists, such as skip hoists and tipples, which require a plurality of operating speeds. By means of my control system I am enabled to obtain a low or creeping speed at the start. From a practical standpoint a much greater ratio can be obtained between the maximum running speed and the creeping speed in a motor of this type than can be obtained by providing a plurality of supply source frequencies for a single speed motor, as disclosed in my Patent No. 1,347,751, or by using a single supply source and obtaining the variations in speed by providing the motor with windings having different numbers of poles.

When a plurality of frequencies are used with a single speed motor, the voltages of the supply sources must be proportional to the frequencies, so that when a low frequency source is provided the voltage of that source will be correspondingly low which will result in high copper losses in both the feeder line and the motor. If transformers are necessary they would need to be of much larger size for corresponding ratings. It will thus be seen that at some frequency the efficiency will be at such a low value that a lower frequency will be prohibitive, and in any given installation there will be a certain minimum value of frequency which it is economical to use. For example, if it is found that in a given 60-cycle installation, the lowest practical frequency that can be installed is 15 cycles, then, neglecting the induction motor slip and considering only the winding synchronous speeds, a 24-pole motor will be required to give a creeping speed of 75 R. P. M. when connected to the 15-cycle source, but this motor will run at a maximum speed of only 300 R. P. M. when connected to the 60-cycle source. This is a desirable creeping speed, but the ratio between the maximum speed and the creeping speed is very low.

Likewise, when using a single supply source and obtaining the variations in running speed by means of a plurality of windings on the motor having different pole numbers, there is a practical limit to the number of poles that can be wound on a motor which is designed for service of this character. As the pole numbers of the winding are increased the power factor will decrease, and the diameter of the rotor must be increased to provide space for the increased number of slots. This increase in diameter of the rotor will cause increased fly-wheel effect which it is very desirable to keep as low as possible since the motor is frequently started and stopped. When the fly-wheel effect is high a considerable portion of the power of the motor will be used during starting to overcome the fly-wheel effect, thus leaving available a proportionately small amount of power for acceleration of the elevator load, which will result in slow acceleration. For the same reason deceleration of the load will be retarded. For example, when using this scheme, if it is found that in a particular application the maximum number of poles with which the motor may be wound is 24, then a creeping speed of 300 R. P. M. will be obtained when the winding is connected to a 60-cycle supply source, and a running speed of 900 R. P. M. may be obtained by providing the motor with an 8-pole winding. This is a high creeping speed, and also the ratio between the two speeds is very low.

According to my present invention, however, I am able to provide a variable speed induction motor control system in which a maximum number of definite speeds are obtainable and also the ratio between the low and the high speed is a maximum for any limitation of frequency or pole number, which may be imposed by practical consideration. Thus, when using my present invention, two sources of supply having frequencies of 15 and 60 cycles, respectively, may be used with a motor equipped with windings having 8 and 24 poles, respectively to obtain four definite motor speeds which are determined respectively by the four different synchronous field speeds resulting from energizing each of the two windings from each of the two sources. By means of this combination a low creeping speed of 75 R. P. M. may be obtained by connecting the 24-pole winding to the 15-cycle source, and a maximum running speed of 900 R. P. M. may be obtained by connecting the 8-pole winding to the 60-cycle source and two intermediate running speeds of 225 R. P. M. and 300 R. P. M. may be obtained by respectively connecting the 24-pole winding to the 60-cycle source and the 8-pole winding to the 15-cycle source.

I also provide means for obtaining automatic deceleration in stopping comprising control switches which are operated by the cage as it approaches the limits of its travel. These switches also serve as a safety device to prevent over-running of the cage.

For a more complete understanding of the nature and objects of this invention, reference should be had to the following detailed description taken in connection with the accompanying drawing, in which Fig. 1 shows in diagrammatic fashion a system of motor control embodying my invention in which I use two induction motors having different numbers of poles, while Fig. 2 is a diagram of connections of the system shown in Fig. 1 as applied to a multi-speed induction motor.

Referring to the drawing, B represents a car or cage having a limited path of travel attached to the cable C which is shown as passing over the head sheave A. The cable C is arranged to be wound upon drum D mounted on the shaft E which is geared to the direct connected induction motors $M_1$ and $M_2$, motor $M_1$ having a greater number of poles than motor $M_1$. Motor $M_2$ is indicated as being of the external resistance type, while motor $M_2$ is of the squirrel cage type.

The motors $M_1$ and $M_2$ are supplied with electric power for rotating the drum D from the two sets of mains 10, 11, 12 and 15, 16, 17, each set having a different frequency. For instance, the mains 10, 11, 12 may be supplied with power at a frequency of 15 cycles, while the set 15, 16 and 17 may be supplied at a frequency of 60 cycles. The voltages of the two sources may be substantially the same. A suitable source of current indicated at $e$ is provided for the control circuits.

The starting, stopping and reversing of the motors $M_1$ and $M_2$ is accomplished by means of the line switches 20 and 21 which are actuated respectively by the electromagnetic windings 22 and 23. These windings are energized and deenergized by means of the master switch or controller F which is preferably mounted on the cage. The switches 20 and 21 are mechanically interlocked, as shown by means of the pivoted bar 29 cooperating with the ends of plungers 30 and 31 in a manner to prevent the closing of one switch until the other is opened.

When the master controller is moved from neutral position to engage the left hand contacts, switch 20 will be closed and the motors will be operated in a direction to raise the cage. When the right hand contacts of the master controller are engaged, switch 21 will be closed and the cage will be lowered.

Switches 46 and 47 are included in the motor circuits for the purpose of selecting either one or both of the motors to be connected to the source of power, as desired. These switches are actuated by means of windings 48 and 49, respectively, which are governed by the master controller. Winding 49 is also controlled by means of switch 53 which is opened and closed by a speed responsive device 54. Speed responsive device 54 is operatively connected to the driving shaft of the motors by means of gearing 55. Switch 46 is biased to make connection with motor $M_2$, while switch 47 is biased to open position.

The connection of the motors with the two supply circuits is controlled by means of the double-throw switch 25 which is actuated by the winding 26. Winding 26 is under the control of both the controller F and the position of the cage B in a manner to be presently described. Switch 25 is biased to normally make connection with the low frequency mains 10, 11 and 12.

The starting resistances $r_2$ and $r_1$ in the rotor circuit of motor $M_1$ are cut out in successive steps as the motor accelerates by means of contactors 27 and 28 which are controlled by windings 40 and 41, respectively.

Auxiliary control switches 34 and 35 are provided in connection with line switches 20 and 21, respectively, and are arranged to close a circuit in parallel with the winding of that switch, 20 or 21, which closes the motor circuit, as the case may be, to energize winding 36 which actuates a contactor 37. The contactor 37 controls a circuit from one set of supply mains to the brake G and is arranged to release the brake upon being closed when the motor circuit is closed.

Auxiliary control switches 38 and 39 are likewise provided in connection with line switches 20 and 21, respectively, and are included in a control circuit to windings 40 and 41 which actuate contactors 27 and 28, respectively. This control circuit is not closed by the closing of switches 38 and 39 until the controller is moved to the second operative position.

When the controller is moved to first position in either the upward or downward direction one or the other of windings 22 or 23 is energized from source $e$, a cage operated switch 32 or 33 being in the circuit according to the position of the controller. Winding 49 is also energized when the controller is moved to the first position in either direction, thus closing switch 47. Motors $M_1$ and $M_2$ are thereby connected in parallel to the low frequency source. Should the controller be moved to the second position in either direction, the winding 26 is energized, as is also winding 48 connected in parallel therewith, a cage operated switch 44 or 45 being in the circuit according to the position of the controller. Winding 49 is deenergized when the controller is moved to second position, if it has not previously been deenergized by speed responsive device 54, and switch 47 accordingly drops out. Upon the energization of windings 26 and 48, switches 25 and 46, respectively, are moved to their upper contact positions, thus connecting motor $M_1$ to the high frequency mains.

The cage operated switches 32, 44, 33 and 45 are placed along the path of travel of the cage near the upper and lower limits thereof as shown. Switches 32 and 44 are arranged near the upper limit of travel so that they are opened as the cage goes up past them and remain open until closed by the cage as it passes them on its downward journey. The switches 33 and 45 are similarly placed near the lower limit of travel but are opened by a downward movement of the cage, remaining open until closed by an upward movement. The switches 44 and 45 which control the energization of windings 26 and 48, and consequently the operation of the motors at high speed, are so placed that they are opened before switches 32 and 33 as the cage approaches its limits of travel. The cage is, therefore, automatically decelerated before it opens either of the switches 32 and 33.

The operation of this invention as thus constructed and arranged is as follows:

Assuming that the cage B is at rest in the position shown in the drawing; in order to start the cage in its upward movement the controller would be moved to the first upward position. A control circuit will then be closed from the source $e$ through the controller contacts to conductor 50, through switch 32, conductor 52 and winding 22 to ground, thus closing switch 20 which connects motor $M_2$ to the low frequency mains, 10, 11 and 12.

When switch 20 is closed, auxiliary control switch 34 is also closed, thereby completing a control circuit from conductor 52 through switch 34, conductor 56 and winding 36 to ground. Winding 36 will move switch 37 to closed position, thereby completing the circuit to the brake G and releasing the same.

Movement of the controller to the first position also completes a control circuit from source $e$ through the controller, conductor 58, switch 53, conductor 59 and coil 49 to ground, thus closing switch 47 which connects motor $M_1$ to the low frequency mains. Motors $M_1$ and $M_2$ are now connected in parallel to the low frequency supply mains.

Motor $M_1$ will have a high starting torque due to the external resistance $r_1$ and $r_2$ in its rotor circuit and will help motor $M_2$, which has an inherently low starting torque, to accelerate. It will be noted that coil 19 connected across two of the leads to motor $M_1$ will be energized, releasing switch 42 which will close. Winding 40, normally controlled by switch 42, will not be energized however for the reason that this control circuit cannot be completed until after the controller is turned to the second position. Motor $M_1$ will therefore operate on this point of the controller with its entire rotor resistance in circuit. At some predetermined speed approaching the normal running speed of motor $M_2$ on the low frequency circuit, speed responsive device 54 will open switch 53, thus deenergizing winding 49 which will then permit switch 47 to open in accordance with its bias. Motor $M_1$ is thus disconnected from the supply circuit and coil 19 deenergized, opening control switch 42. Motor $M_2$ will now run at its normal synchronous speed on the low frequency circuit and will raise the cage at the lowest running speed.

Should it now be desired to hoist the cage at high speed, the controller F would be moved to the second upward position, completing a control circuit from source $e$ through the controller contacts to conductor 54, through switch 44, conductor 66, and winding 26, to ground, thus throwing switch 25 to its upper position into contact with the high frequency mains.

A second control circuit is also completed when the controller is moved to second position. This circuit is in parallel with coil 26, from conductor 66, through conductor 59 and coil 48 to ground. Switch 46 is thus thrown to its upper position, connecting motor $M_1$ to the high frequency circuit and at the same time disconnecting motor $M_2$. Motor $M_1$ will now begin to accelerate to its normal synchronous running speed on the high frequency circuit. Switch 42 was released by the energization of winding 19 when motor $M_1$ was connected to the high frequency supply circuit. After a definite interval of time, determined by a time element device, shown as a dashpot 42′, the switch 42 will close, thus completing a control circuit in parallel with coil 26 through control switch 38 which was closed by the closing of switch 20. This circuit is from conductor 66, through conductor 62, auxiliary control switch 38, conductor 57, control switch 42, conductor 60 and coil 40 to ground. Switch 27 will be closed by the energization of coil 40, thus cutting out resistance $r_2$ from the rotor circuit of motor $M_1$, the current in the rotor circuit having decreased to a safe value during the time interval introduced by dashpot 42′. The closing of switch 27 releases control switch 43 which in like manner will close a control circuit from conductor 57 through conductor 61 and coil 41 to ground after a time interval determined by dashpot 43′. The energization of winding 41 will close switch 28 thus cutting out resistance $r_1$ and short circuiting the rotor of motor $M_1$. Motor $M_1$ will now be running at its normal synchronous speed for the high frequency circuit and will raise the cage at high speed. It will be noted that switch 45 was closed by the cage soon after starting on its upward movement.

When the cage B approaches its upper limit of travel it will first open switch 44 thereby opening the control circuit to windings 26 and 48. Switches 25 and 46 will consequently drop to their lower positions, thus disconnecting motor $M_1$ and connecting motor $M_2$ to the low frequency mains. Winding 41 will likewise be deenergized which will permit switch 28 to open. Motor $M_2$ will now act as a generator and automatically decelerate the cage during the time that the cage is traveling from control switch 44 to control switch 32. When the cage opens control switch 32, which will be at a point very near to its upper limit of travel, the circuit to windings 22 and 36 will be broken, thus permitting switch 20 to open in accordance with its bias and applying the brake G, whereby the cage is brought to a stop.

By moving the controller F to its first downward position and then to its second downward position, the cage B will be started on its downward journey first at low speed, then at high speed, by first connecting motors $M_1$ and $M_2$ to the low frequency circuit through switch 21, cutting out motor $M_1$ by means of the speed controlled switch 53, and then connecting motor $M_1$ to the high frequency circuit and automatically accelerating the same to normal running speed on this circuit. It will be observed that the switches 26, 48 and 49 have a progressive sequence of operation in connecting the motor winding and the sources for accelerating or decelerating the load. This will take place in substantially the same manner as described above in connection with the hoisting movement. It will be seen that in the downward movement of the cage the control circuits in the low speed and high speed positions of the controller are completed through conductor 51 and cage operated switch 33 and through conductor 63 and cage operated switch 45, respectively.

As the cage approaches the lower limit of its travel the switch 45 will first be opened to deenergize windings 26, 48 and 41, thus disconnecting motor $M_1$ and connecting motor $M_2$ to the low frequency mains for deceleration. Soon after this takes place the switch 33 will be opened by the cage, thus allowing switch 21 to open in accordance with its bias and apply the brake G to stop the cage.

The arrangement of the cage operated switches 32, 44, 33 and 45 along the path of the cage is by no means the only possible operative arrangement. Those skilled in the art will readily perceive that they may be arranged so as to not only decelerate the cage but to accelerate the cage when desired points are reached.

The deceleration and stopping of the cage may obviously be accomplished at all times by means of the master controller by turning it in successive steps back to the neutral position. The stopping of the cage at points intermediate the automatic cage operated switches must obviously be accomplished exclusively by the use of the controller. The cage operated control switches are provided primarily for the purpose of insuring the safe stoppage of the cage between its limits of travel, although as indicated above these switches may be relied upon to gradually decelerate and stop the cage.

In Fig. 2 I have shown the motor connections of the system disclosed in Fig. 1 as applied to a single induction motor $M_3$ of the multi-speed type which is provided with a plurality of field windings having different numbers of poles. The switch 47 and speed responsive device 54 are omitted in this application of my invention, the system being otherwise identical with that shown in Fig. 1.

The upper terminals $t_1$ of motor $M_3$ lead to the field winding with the lesser number of poles, while the lower terminals $t_2$ lead to the field winding having the greater number of poles. The rotor of motor $M_3$ is also provided with two windings having different numbers of poles. One rotor winding will be energized by the field winding having the lesser number of poles and will be wound to have a corresponding number of poles, while the other rotor winding will be energized by the field winding having the greater number of poles and will be wound to have a number of poles corresponding thereto. The rotor windings will be so placed with respect to each other on the rotor that the energization of one winding will not inductively affect the other winding. The rotor winding having the greater number of poles, which is energized by the field winding to which the terminals $t_2$ are connected, is short circuited upon itself. The rotor winding having the lesser number of poles is connected to slip rings and will be provided with external resistance as indicated in Fig. 1 in connection with motor $M_1$. This rotor winding will therefore give a high starting torque. In effect, therefore, the field winding of motor $M_3$ having terminals $t_1$, with its corresponding rotor winding, will be the equivalent of motor $M_1$, of Fig. 1, while the field winding of motor $M_3$ having terminals $t_2$, with its corresponding rotor winding, will be the equivalent of motor $M_2$, of Fig. 1.

The two sets of windings of motor $M_3$ will be connected to the supply mains in substantially the same manner as described in connection with motors $M_1$ and $M_2$ of Fig. 1, keeping in mind the analogy between the sets of windings of motor $M_3$ and the motors $M_1$ and $M_2$; but with one exception due to the fact that the speed controlled switch 47 is omitted. By reason of this, it will be seen that the set of windings corresponding to motor $M_1$ will not be connected in parallel with the set of windings corresponding to motor $M_2$ to the low frequency mains for the purpose of utilizing the high starting torque of the same during low speed acceleration. Obviously, however, this could be accomplished in the manner described in connection with Fig. 1, by means of the speed controlled switch 47.

Although I have described the connections necessary to obtain only two normal running speeds; low speed and high speed, it will be obvious that with the help of switching devices of appropriate character I could obtain intermediate normal running speeds by connecting the supply mains to the motors as follows: for second running speed low frequency to motor having lesser number of poles, third running speed high frequency to motor having greater number of poles, the connections for lowest and highest speeds being as described. In this case the voltages of the two sources will be in substantially the same ratio as their frequencies, as disclosed in my patent previously referred to. By properly selecting the frequencies and pole numbers gradual step by step acceleration could be obtained. Any number of running speeds could be obtained as desired by varying the number of sets of supply mains of different frequencies, by varying the number of motors, or sets of motor windings, having different numbers of poles, or by increasing or decreasing the number of both.

In accordance with the provisions of the patent statutes, I have described the principle of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. A control system for electric motors comprising a plurality of sources of electrical supply each having a different frequency, a plurality of induction motor field windings associated with a common driven load each having a different number of poles, and switch mechanism and connections whereby the field windings are first connected to the supply source having the lowest frequency, the field winding having the lowest number of poles is disconnected from the source at a predetermined speed of the load, and finally the field winding for the highest number of poles is disconnected from the source having the lowest frequency and the field winding having the lowest number of poles connected to a source having a higher frequency.

2. A variable speed induction motor control system comprising a plurality of sources of electrical supply, each having a different frequency, a selective switch for the same biased to normally make connection with the low frequency source, a plurality of induction motor field windings, each having a different number of poles, a selective switch for the field windings biased to normally make connection with the field winding having the greatest number of poles, a rotor member associated with the field windings so as to be driven by induction therefrom, line switches for making and breaking the connections from any one of said sources of supply to any one of said field windings for both directions of rotation of said rotor member, and means comprising a master controller for closing said line switches to start said rotor member at low speed and for throwing said selective switches to accelerate said rotor member to a higher speed.

3. A variable speed induction motor control system comprising a plurality of sources of electrical supply, each having a different frequency, a selective switch for the same biased to normally make connection with the low frequency source, a plurality of induction motors connected to a driving shaft, each motor having a different number of poles, a selective switch for the induction motors biased to normally make connection with the motor having the greatest number of poles, line switches for making and breaking the connections from any one of said sources of supply to any one of said motors for both directions of rotation, and means comprising a master controller for closing said line switches to start said driving shaft at low speed and for throwing said selective switches to accelerate said driving shaft to a higher speed.

4. A variable speed induction motor control system comprising a plurality of sources of electrical supply, each having a different frequency, a selective switch for the same biased to normally make connection with the low frequency source, a plurality of induction motors connected to a driving shaft, each motor having a different number of poles, a selective switch for the induction motors biased to normally make connection with the motor having the greatest number of poles, an auxiliary switch biased to open position for the motor having the least number of poles, line switches for making and breaking the connections from any one of said sources of supply to said motors for both directions of rotation, and means comprising a master controller for closing said line switches and said auxiliary switch to connect said motors in parallel to accelerate the driving shaft to low running speed and for throwing said selective switches to accelerate said driving shaft to a higher speed, and speed responsive means for opening said auxiliary switch at some speed below the low running speed.

5. A variable speed induction motor control system comprising a plurality of sources of electrical supply, each having a different frequency, a selective switch for the same biased to normally make connection with the low frequency source, a plurality of induction motors connected to a driving shaft, each motor having a different number of poles, the motor with the least number of poles having a high starting torque, a selective switch for the induction motors biased to normally make connection with the motor having the greatest number of poles, an auxiliary switch biased to open position for the motor having a high starting torque, line switches for making and breaking the connections from any one of said sources of supply to said motors for both directions of rotation, and means comprising a master controller for closing said line switches and said auxiliary switch to connect said motors in parallel to accelerate the driving shaft to low running speed, and for throwing said selective switches to accelerate said driving shaft to a higher speed, and speed responsive means for opening said auxiliary switch at some speed below the low running speed.

In witness whereof, I have hereunto set my hand this 11th day of January, 1921.

ROBERT H. McLAIN.